(12) United States Patent
Hung

(10) Patent No.: US 11,486,369 B2
(45) Date of Patent: Nov. 1, 2022

(54) ROTOR SYSTEM FOR GENERATING KINETIC ENERGY BY GENERATING AN UNBALANCED TORQUE BY MEANS OF MATERIAL ENERGY

(71) Applicant: Ming-Tung Hung, Taipei (TW)

(72) Inventor: Ming-Tung Hung, Taipei (TW)

( * ) Notice: Subject to any disclaimer, the term of this patent is extended or adjusted under 35 U.S.C. 154(b) by 258 days.

(21) Appl. No.: 16/684,149

(22) Filed: Nov. 14, 2019

(65) Prior Publication Data
US 2021/0148232 A1    May 20, 2021

(51) Int. Cl.
*F03G 3/04*    (2006.01)

(52) U.S. Cl.
CPC ..................................... *F03G 3/04* (2013.01)

(58) Field of Classification Search
CPC ..... F01D 1/18; F01D 1/30; F01D 1/34; F03B 7/00; F03G 3/00; F03G 3/02; F03G 3/04
See application file for complete search history.

(56) References Cited

U.S. PATENT DOCUMENTS

| | | | | |
|---|---|---|---|---|
| 4,030,300 A | * | 6/1977 | Thompson | F03G 3/04 60/639 |
| 2021/0148232 A1 | * | 5/2021 | Hung | F03G 3/04 |

* cited by examiner

*Primary Examiner* — Christopher R Legendre
(74) *Attorney, Agent, or Firm* — Rabin & Berdo, P.C.

(57) ABSTRACT

A rotor system for generating kinetic energy by expanding an unbalanced torque by means of material energy is provided. The rotor has a horizontal rotating shaft and a plurality of sets of radiating members, and each of radiating members combines with a swingable mass and a slidable member that are combined with each other by a transmission system. The slidable member has two containers, each with an opening for holding the substances in the opposite direction, and after the substances are injected into a specific orientation, due to the total weight being greater than the swingable mass that plus the inclination and gravity, which causes the swingable mass to be swung at one hundred and eighty degrees. Therefore, an outer ring system and an inner ring system both generate the torsion toward the running direction so that the entire rotor system generates good operating kinetic energy.

12 Claims, 11 Drawing Sheets

ROTOR SYSTEM FOR GENERATING KINETIC ENERGY BY GENERATING AN UNBALANCED TORQUE BY MEANS OF MATERIAL ENERGY

BACKGROUND OF THE INVENTION

1. Field of the Invention

The present invention relates to a device for generating operational kinetic energy, and more particularly to a rotor system for generating kinetic energy by generating an unbalanced torque by means of material energy.

2. The Prior Arts

With the development of human civilization and the improvement of the quality of life, energy consumption is increasing. The current petrochemical energy is depleted and nuclear energy is unresolved. Finding clean and reliable alternative energy has become an urgent need of human being.

Among various alternative energy sources, wind, water and solar energy are recognized, but they all have limitations, such as insufficient water, or small drop, or lack of water, or no wind season, or rainy days or nights, or insufficient sunshine, which have difficulties in use. As a result, in the general countries, the proportion of wind, water, solar energy and other clean energy is not large. Without introducing new concepts and breakthrough measures, polluting fossil fuels and nuclear energy are still used as energy sources.

SUMMARY OF THE INVENTION

For the above reasons, the present invention provides a rotor system that generates an unbalanced torque to generate operational kinetic energy by exploiting material energy to promote the development of clean, inexpensive, and reliable energy sources and to enhance human beings' welfare. The present invention combines with the factors of gravity, material high and low drop potential energy, gravity acceleration, torque, inertia and the like. That is, a system is provided which simultaneously combines with different energy factors to assist in generating an unbalanced torque of the rotor system, thereby rotating the reels for providing kinetic energy. More specifically, it can be used in areas where water is scarce, but only in a small amount of water, or at a specific stage of the water transport process, or in the mass drop of bulk conveyor belts such as ore, grain, or the like, or where the terrain is poor and it is difficult to develop water and electricity, which makes full use of the low energy and weight of fluids or bulk materials to help to generate the unbalanced torque and develop operational kinetic energy To arrive at the above objective, the present invention provides a rotor system for generating kinetic energy by generating an unbalanced torque by means of material energy, comprising: a horizontal rotating shaft, and a plurality of sets of radiating members. The radiating members are fixed to the horizontal rotating shaft and rotating with the horizontal rotating shaft. Each of the radiating members has a proximal end adjacent to the horizontal rotating shaft and a distal end opposite to the proximal end, wherein each of the radiating members comprising: a truss symmetrically disposed at a position on the radiating member adjacent to the distal end; a sub-shaft disposed on the distal end of the radiating member; a swingable mass that is combined with the sub-shaft, and the swingable mass for swinging toward a running direction or a reverse running direction about the sub-shaft as a center; an elongate member disposed on the radiating member adjacent to the proximal end and facing one side of the running direction, and the elongate member forming an included angle with the radiating member; a slidable member having two containers, each with an opening for holding the substances in the opposite direction and disposed on the elongate member and configured to be slidably disposed at a distance; a transmission system coupled to the swingable mass and the slidable member so that sliding of the slidable member drives the swingable mass for swinging; an auxiliary system for transporting the substances, independently disposed on the side of the reel, and feeding the substances into the containers of the slidable member at a specific orientation of the reel, with the gravitational acceleration of the falling substances, the weight of the substances, and the weight of the slidable member itself, causing the slidable member to slide down to drive the swingable mass for swinging.

The entire rotor system has an inner ring system and an outer ring system. The inner ring system includes the slidable member and the held substances, and the outer ring system is composed of the swingable mass.

The orientation of the substances enters into the containers of the slidable member:

1. When the weight of the swingable mass is greater than the weight of the slidable member, there are two material outlets of the system for transporting the substances, respectively disposed at the left side and the right side of the rotor system divided by a vertical central axis slightly above the horizontal position. When a position corresponds to the radiating member that is approximately at a horizontal orientation of three o'clock, one of the substance outlets is injected with a large amount of substances for one of the containers of the slidable member. When a position corresponds to the radiating member that is approximately at a horizontal orientation of nine o'clock, another substance outlet is injected with a smaller amount of substances for another container of the slidable member. Although the weight of the injected substances are different in different orientations, the total weight of the slidable member adds the injected with substances is greater than the weight of the swingable masses and slides downward, and then the swingable masses are swung through the transmission system, so that the length of the force arm of the swingable masses that generate the torsion toward the running direction is lengthened and enlarged, and the length of the force arm of the swingable masses that generate the torsion toward the reverse running direction is shortened and reduced. By changing the force arm and the torque, the outer ring system formed by the swingable masses generates the torque toward the running direction.

The slidable member is at an orientation of about from four o'clock to six o'clock, which is a state that a large amount of substances are held and the average force arm length is longer. By contrast, the slidable member is at an orientation of about from ten o'clock to twelve o'clock, which is a state that a small amount of substances are held and the average force arm length is shorter. After the forward and reverse torsions are reciprocated each other in the two orientations between the slidable members and the held substances, there is still a huge torsion toward the running direction.

The average force arm length of the slidable member between about from six o'clock orientation to nine o'clock orientation is greater than the average force arm length between about twelve o'clock orientation to three o'clock orientation, this is because the state of from decrementing down of the held substances to reaching at unfilled substances, that is, there is almost only the weight of the relatively light slidable member itself. Therefore, the slidable members will only have a relatively small counter-rotation torque (i.e., resistance) after the forward torsion and the reverse torsion are reciprocated each other in the two orientations.

After the inner ring system has a huge torsion toward the running direction and a small torsion toward the reverse running direction that are reciprocated each other, there is still a huge torsion toward the running direction.

The entire rotor system is composed of the outer ring system that generates the torsion toward the running direction and the inner ring system that also generates the torsion toward the running direction, so the rotor system will operate toward the running direction.

2. When the weight of the swingable mass is less than the weight of the slidable member, there are two substances outlets of the system for transporting the substances, which are arranged in a single direction divided by the vertical center axis of the rotor system. One of the two substances outlets is about the slidable member over the twelve o'clock orientation, and the other of the two substance outlets is about the radiating member at three o'clock orientation for respectively feeding the substance into the containers with different opening directions of the slidable member. Thereby, the weight of the slidable member on one side of the inner ring system is increased to generate the torsion toward the running direction, and the inner ring system which originally generates the torsion toward the reverse running direction is changed to generate the forward torsion toward the running direction.

When the radiating member is located at the horizontal position of the runner system at three o'clock and nine o'clock, the slidable member slides downward due to the inclination and gravity, and then the swingable mass is swung through the transmission system so that the length of the force arm of the swingable mass that generates the torsion toward the running direction becomes longer and magnifies while the length of the force arm of the swingable mass that generates the torsion toward the reverse direction becomes shorten and smaller. By changing the force arm and the torque, the outer ring system formed by the swingable masses generates the torsion toward the running direction.

The entire rotor system is composed of the inner ring system that generates the torsion toward the running direction and the outer ring system that also generates the torsion toward the running direction, so the rotor system will operate toward the running direction.

In short, regardless of whether the weight of the slidable member is greater than or less than the weight of the swingable mass, with the aid of material energy, the inner ring system and the outer ring system both generate the torsion toward the same direction, which will make the rotor system generate good operating kinetic energy.

According to an embodiment of the present invention, the swingable mass has a swing of about one hundred and eighty degrees.

According to an embodiment of the present invention, the elongate member forming the included angle with the radiating member is from thirty-five to fifty-five degrees.

According to an embodiment of the invention, the elongate member is provided with two blocking members that are separated from a distance each other, and the slidable members are slidably disposed between the blocking members.

According to an embodiment of the present invention, the elongate member is flat and the slidable member has a groove that is slightly wider enough to match the elongate member.

According to an embodiment of the present invention, the elongate member is two circular tubes, and the slidable member is provided with two through holes which the tubes pass through.

According to an embodiment of the present invention, the slidable member has two containers each with an opening for holding the substances in the opposite direction.

According to an embodiment of the present invention, the swingable mass is combined with the sub-shaft through a skeleton-type extension structure, and a joint point of the swingable mass that the transmission system pulls is at an edge side of another skeleton type extension structure extending from the top end of the swingable mass.

According to an embodiment of the present invention, each of the transmission systems includes two strip-shaped transmission members, which are respectively combined with the two sides of the swingable mass, and after they pass through respectively the two pulley blocks disposed at both ends of the truss. One passes through the pulley block disposed on the radiating members toward the reverse running direction, and then passes through the pulley block at the joint of the elongated member near the radiating member and passes through a position that is provided by the blocking member to allow the strip-shaped transmission member to pass through again, and finally is combined with one side of the slidable member. After another strip member firstly passes through the pulley block disposed at the edge of the truss, and passes through the pulley block disposed at the edge of the elongate member again, and then passes through a position that is provided by the blocking member to allow the strip-shaped transmission member to pass through again, and finally is combined with another side of the slidable member.

According to an embodiment of the present invention, the pulley of each of pulley blocks has a deeper, wider U-shaped recess and the transmission system combined with the swingable mass and the slidable member is not in a tight state, but is in a slightly loose state but does not cause the strip transmission member to be loosened from the pulley, which is advantageous for the transmission system in the operation state.

According to an embodiment of the present invention, the weight of the slidable member itself adds the total weight of one of the containers after holding the substances is greater than the weight of the swingable mass and is sufficient to slide and the transmission system drives the swingable mass for swinging.

According to an embodiment of the present invention, each of the transmission systems further includes: a first multiple winch set disposed on one side of the radiation member facing the reverse running direction; and a second multiple winch set is disposed at an end opposite to a set point of the elongate member and the proximal end, wherein the swingable mass and the two sides of the slidable member are respectively combined with a single transmission member, and the strip-shaped transmission members combined with the swingable mass respectively pass through the pulley block disposed at the edge of the truss and combined with the first multiple winch set and the second multiple winch set, and the strip-shaped transmission member combined with the slidable member firstly passes through the blocking member for passage, and then passes through a pulley block or two pulley blocks and then is combined with the first multiple winch set again, and another strip-shaped transmission member combined with the slidable member passes through the blocking member for passage, and is then directly combined with the second multiple winch set.

According to an embodiment of the present invention, the first multiple winch set and the second multiple winch set are respectively composed of a large winch and a small winch through a coaxial coaxial shaft and synchronously rotated, and the large winch and the small winch wind the strip-shaped transmission member in the opposite direction. When the large winch winds the strip-shaped transmission member combined with it to be tightened, the small winch winds the strip-shaped transmission member combined with it to be loosened. On the other hand, when the large winch winds the strip-shaped transmission member combined with it to be loosened, the small winch winds the strip-shaped transmission member combined with it to be tightened.

According to an embodiment of the present invention, the direction that the large winch of the first multiple winch set coupled to the strip-shaped transmission member winds is opposite to the direction that the large winch of the second multiple winch set coupled to the strip-shaped transmission member winds, and the direction that the small winch of the first multiple winch set coupled to the strip-shaped transmission member winds is opposite to the direction that the small winch of the second multiple winch set coupled to the strip-shaped transmission member winds.

According to an embodiment of the present invention, the length of the large winches that correspond to the strip-shaped transmission member to be tightened or loosen is approximately the same as the maximum swing of the strip-shaped transmission member driven by the swingable mass for swinging. In addition, the length of the small winches that correspond to the strip-shaped transmission member to be tightened or loosen is approximately the same as the distance that the distance the slidable member slides.

According to another embodiment of the present invention, the length of the large winches that correspond to the strip-shaped transmission member to be tightened or loosen is approximately the same as the distance that the distance the slidable member slides. In addition, the length of the small winches that correspond to the strip-shaped transmission member to be tightened or loosen is approximately the same as the maximum swing of the strip-shaped transmission member driven by the swingable mass for swinging.

According to an embodiment of the present invention, the rotor system includes more than two reels, and the reels are all coupled to the same horizontal rotating shaft.

It will be understood by those skilled in the art that the effects of the present invention are not limited to the details described above, and the advantages of the present invention will be more clearly understood from the detailed description.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
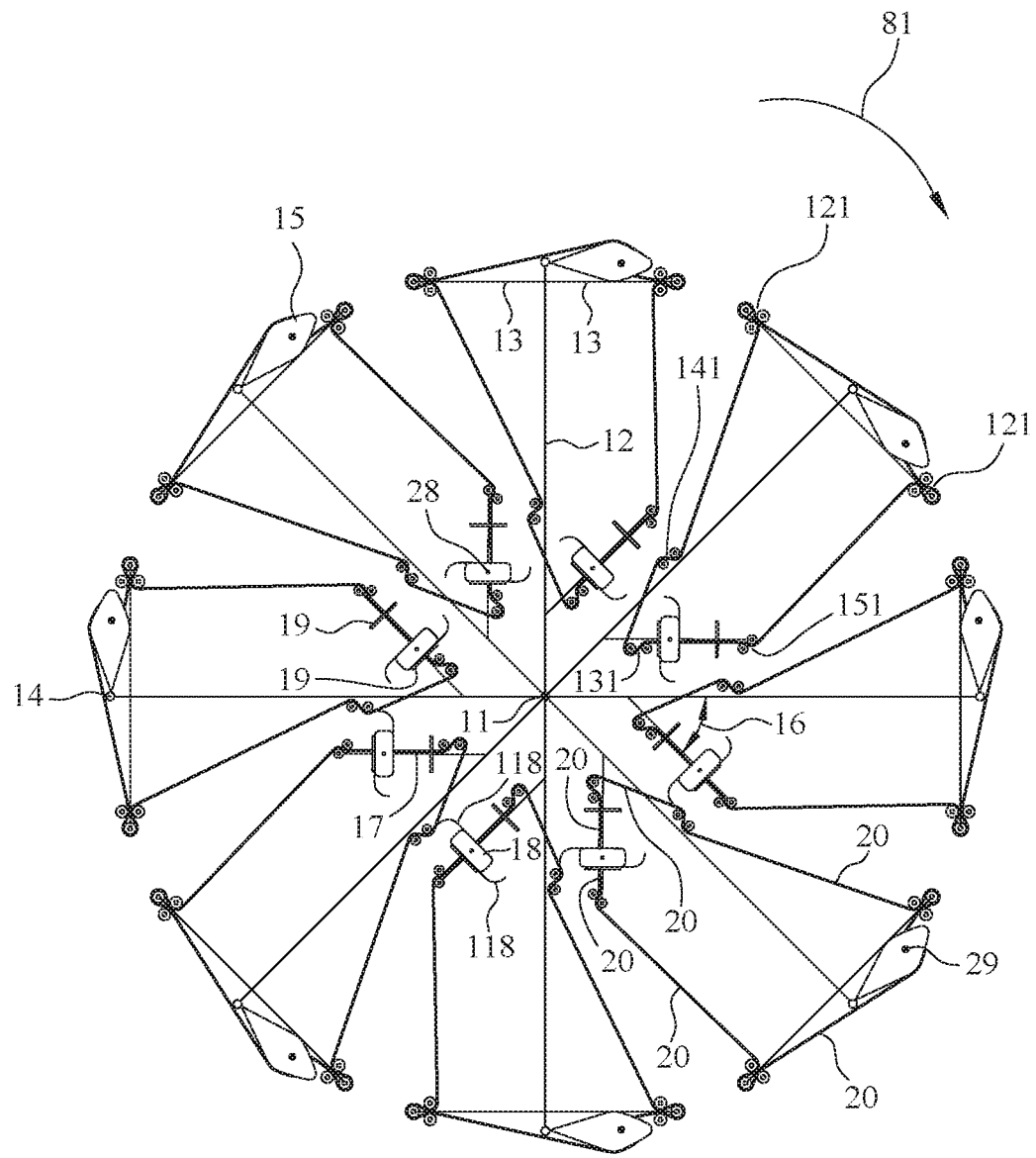
FIG. 1 is a schematic view of the rotor system according to an embodiment of the present invention.

FIG. 1 is a schematic view of a rotor system in accordance with an embodiment of the present invention. As shown in FIG. 1, a rotor system according to an embodiment of the present invention is constituted by a horizontal rotating shaft 11 and a plurality of sets of radiating members 12 provided on the horizontal rotating shaft 11. Hereinafter, the structure of each set of the radiating members 12 will be described.

As shown in FIG. 1, each set of radiating members 12 has a proximal end adjacent to the horizontal rotating shaft 11 and a distal end far from the horizontal rotating shaft 11. The radiating member 12 is symmetrically disposed with a truss 13 of equal length on both sides at a position adjacent to the distal end, and a sub-shaft 14 is disposed at the distal end. The sub-shaft 14 combines with a mass 15, in which the mass 15 is for swinging toward a running direction 81 or a reverse running direction about the sub-shaft 14 as a center, and the swing range is approximately one hundred and eighty degrees.

The radiating member 12 has a set of elongate member 17 on a side toward the running direction 81 adjacent to the proximal end of the horizontal rotating shaft 11. The elongate members 17 forming an included angle 16 with the radiating member 12 may be from thirty-five degrees to fifty-five degrees. The elongate member 17 that is combined with a slidable member 18 having two containers 118 each with an opening for holding the substances in opposite directions 22. The slidable member 18 is slidably disposed at a certain position on the elongate members 17. More specifically, the slidable member 18 is slidable range of the elongate members 17 between two sets of blocking members 19 that are separated from a certain space. The blocking members 19 can limit the slidable range of the slidable member 18, and can also allow a strip-shaped transmission member 20 to pass. When the blocking members 19 are in the form of a sheet, the blocking members 19 should be provided with a hole which the strip-shaped transmission member 20 can pass through.

Figure 2:
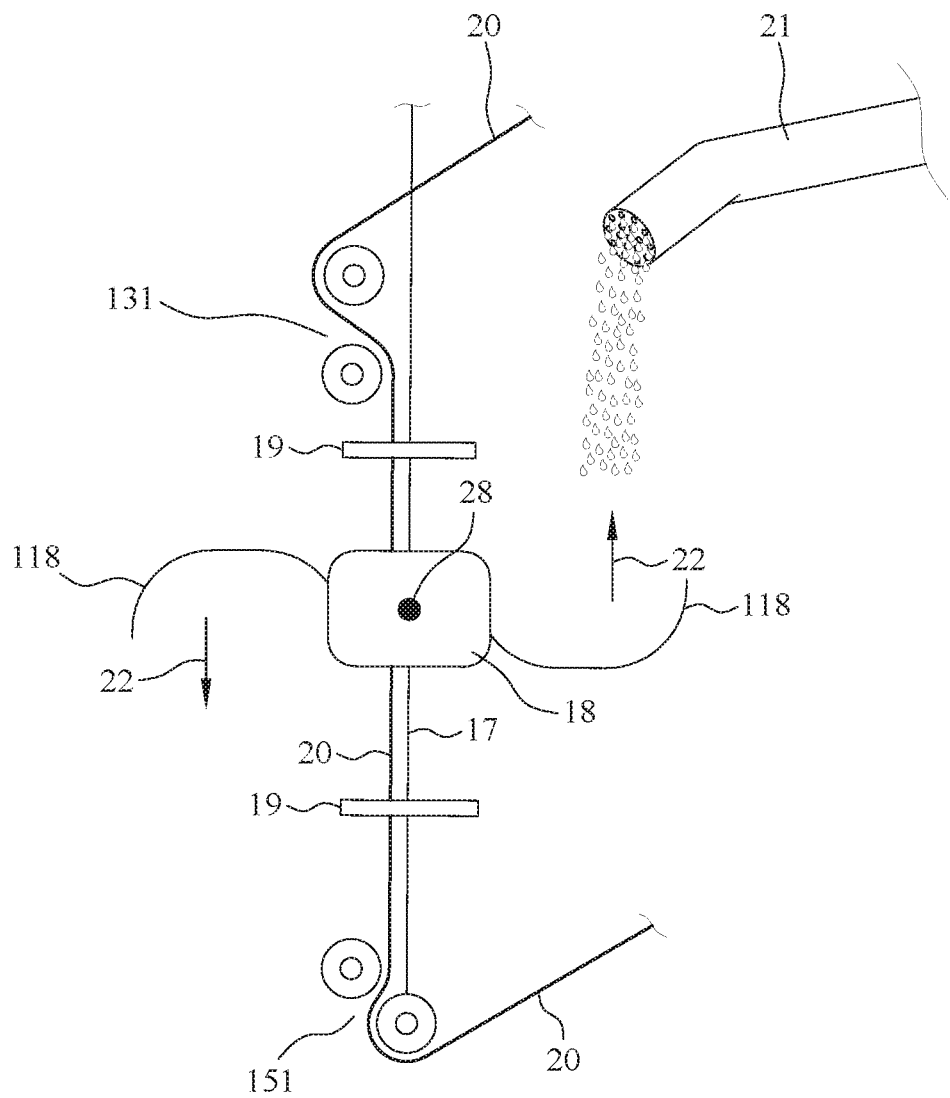
FIG. 2 is a schematic view of the slidable member that is injected with the auxiliary system of the fed substances according to an embodiment of the present invention.

As shown in FIG. 2, the containers 118 of the slidable member 18 are injected with an auxiliary system 21 of the fed substances independently provided on the side of the reel, and one container 118 of the slidable members 18 for holding the substances which is located approximately at three o'clock orientation of the radiating member 12 is filled with the auxiliary system 21 of the fed substances. Another container 118 of the slidable members 18 for holding the substances which is located approximately at nine o'clock orientation of the radiating member 12 is filled with the auxiliary system 21 of the fed substances.

The weight of the slidable member 18 itself adds the total weight of one of the containers 118 for holding the substances is greater than the weight of the mass 15 and is able to slide down and the transmission system drives the mass 15 for swinging. In addition, different types of the strip-shaped transmission members 20 that are coupled to the transmission systems can be employed depending on the type of transmission system employed in the rotor system. For example, when the transmission member used in the turning point in the rotor system is a pulley, the strip-transmission member 20 of the transmission system may be a steel cable combined with a pulley. When the transmission member used in the turning point in the rotor system is a gear, the strip-transmission member 20 of the transmission system may be a chain combined with the gear.

Figure 3:
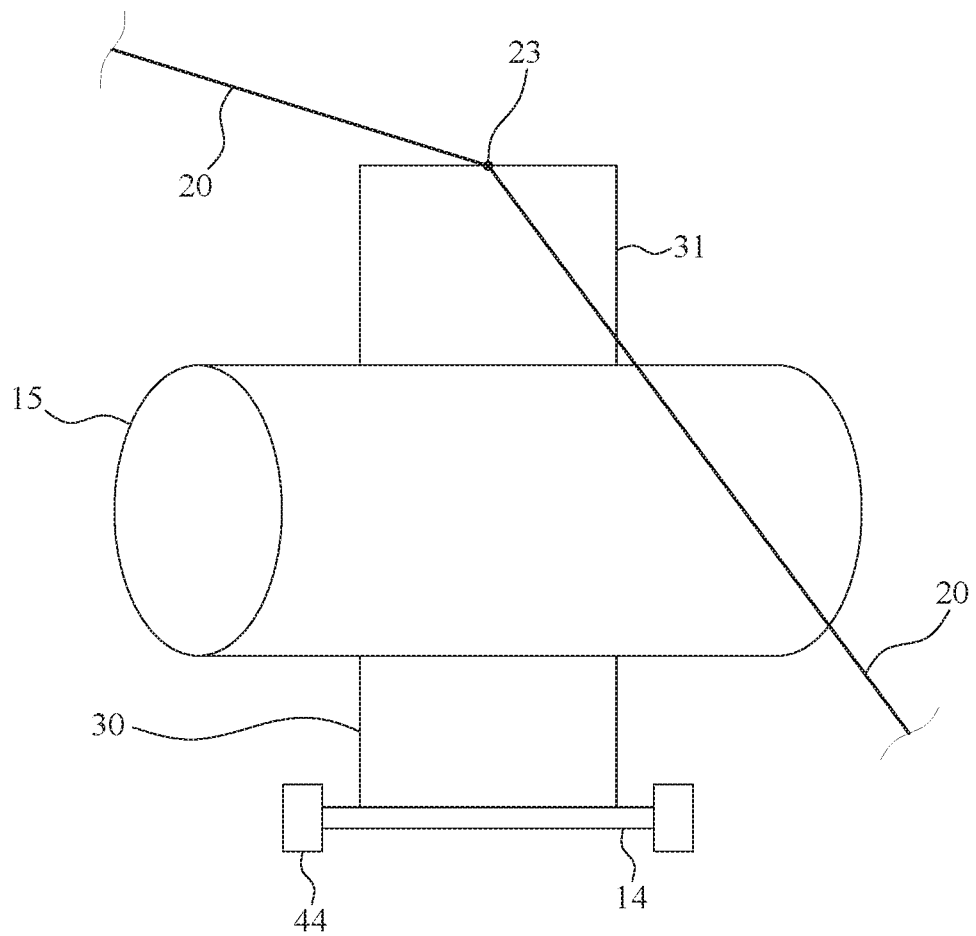
FIG. 3 is a schematic view of the swingable mass according to another embodiment of the present invention.

In an embodiment of the present invention, as shown in FIG. 1, the strip-transmission member 20 is coupled to the mass 15 on two sides of the mass 15. In another embodiment, as shown in FIG. 3, the mass 15 that is combined with the sub-shaft 14 through a skeleton-type extension structure 30, and a joint point 23 of the strip-shaped transmission member 20 and the mass 15 is located at one side end of another skeleton-type extension structure 31 which extends from the top end of the mass 15.

Figure 4:
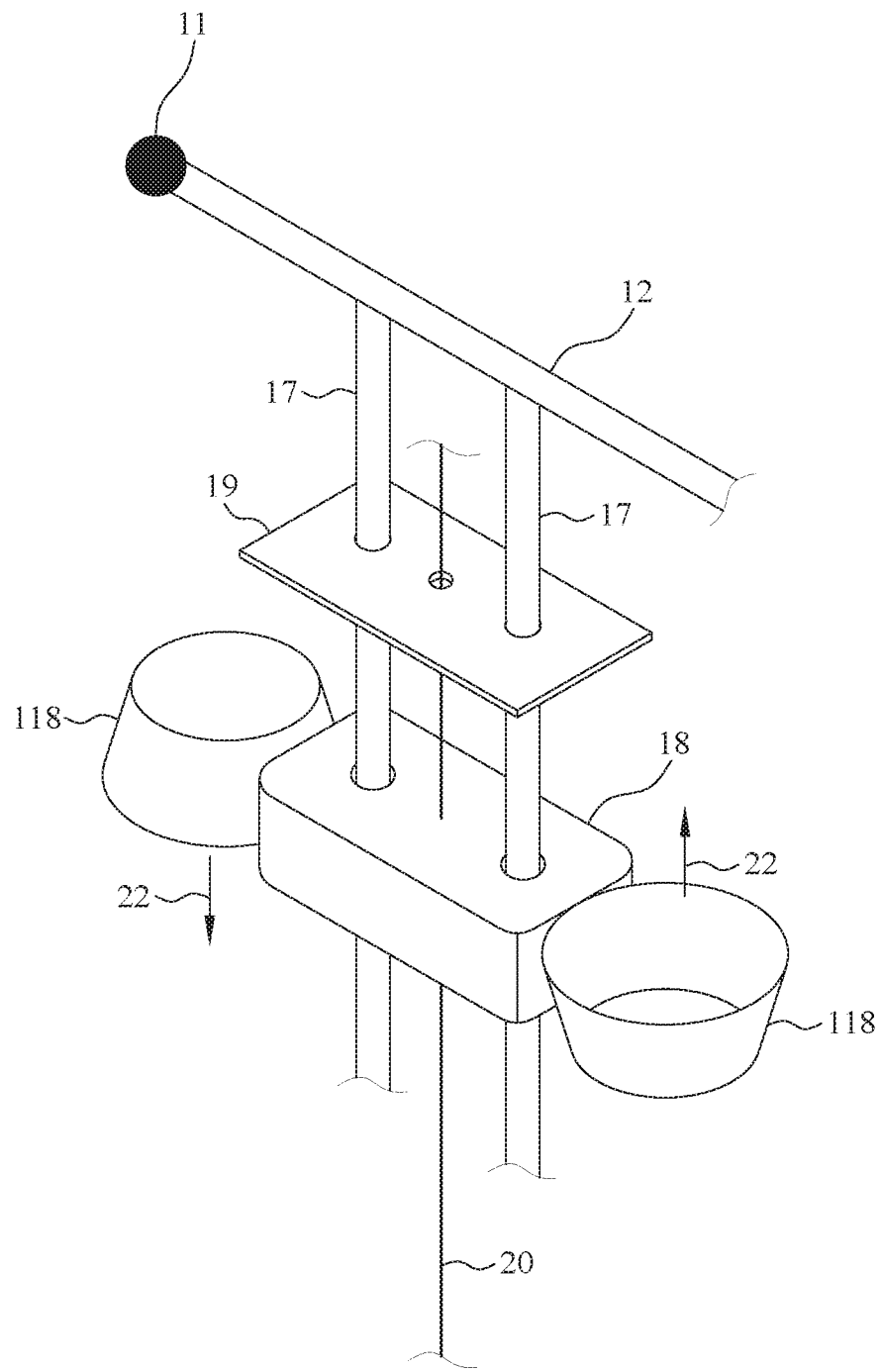
FIG. 4 is a schematic view of the slidable member having two containers each with an opening in the opposite direction according to an embodiment of the present invention.

In an embodiment of the present invention, as shown in FIG. 4, the elongate member 17 that is combined with the slidable member 18 may be an elongate member 17 formed of a pair of two circular tubes, and the slidable member 18 is provided with two through holes for the passage of the tubes.

Figure 5:
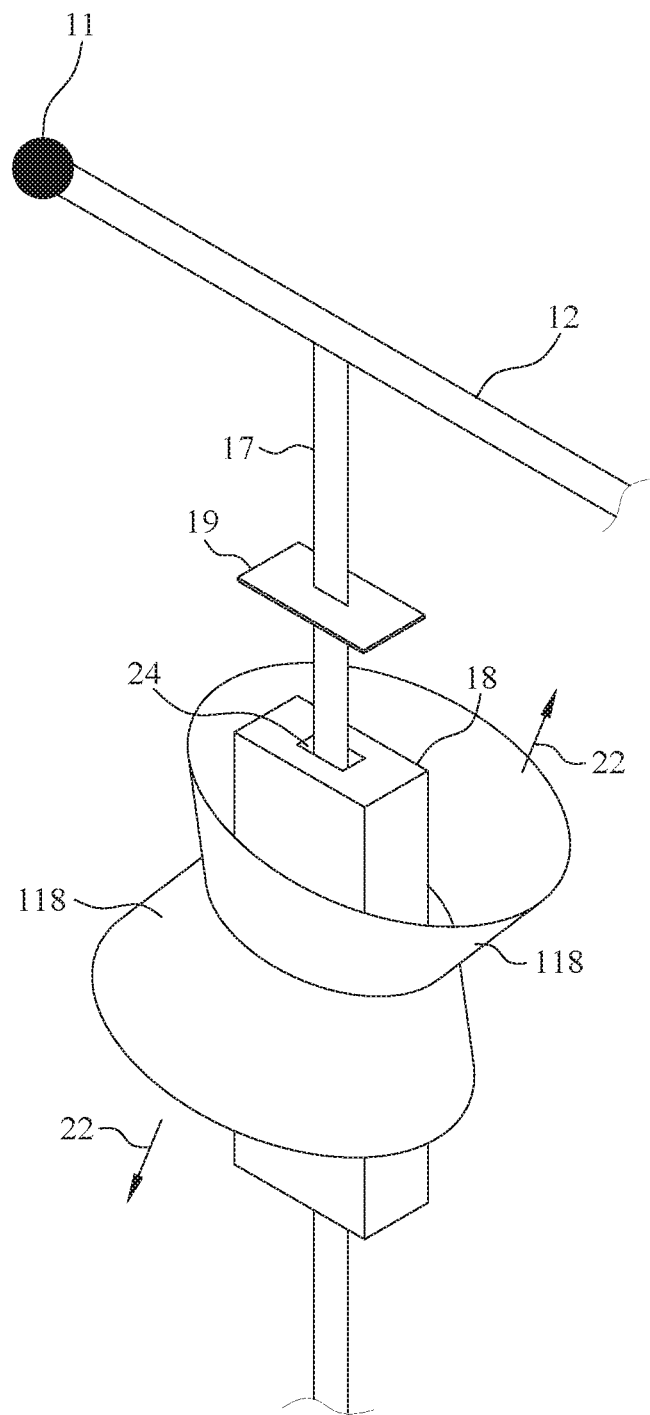
FIG. 5 is a schematic view of the slidable member having two containers each with an opening in the opposite direction according to another embodiment of the present invention

In another embodiment of the present invention, as shown in FIG. 5, the elongate member 17 that is combined with the slidable member 18 may be a flat elongate member 17, and the slidable member 18 that is provided with a slightly large width to fit the flat elongate member 17 to facilitate the sliding of a chute 24.

Hereinafter, the transmission system of each set of the radiating members 12 will be described in detail.

As shown in FIG. 1, each set of the radiating members 12 has a complete transmission system. Specifically, the transmission system of each set of the radiating members 12 includes a pulley block 121, a pulley block 131, a pulley block 141, and a pulley block 151, and two strip-shaped transmission members 20.

The pulley block 121 composed of three pulleys is respectively disposed at both side ends of the truss 13. The pulley block 131 that is composed of two pulley blocks is disposed at a joined end of the elongate member 17 adjacent to the radiating member 12. The pulley block 141 that is composed of two pulleys is disposed on one side of the radiating member 12 in the reverse running direction. The pulley block 151 is composed of two pulleys disposed at the side ends of the elongate members 17.

The mass 15 that is combined with the strip-shaped transmission member 20 on both sides toward the running direction 81 and the reverse running direction, and the two strip-shaped transmission members 20 respectively pass through the pulley block 121 at both ends of the truss 13, and one passes through the pulley block 141 again and then passes through the pulley block 131 again, and passes through the blocking member 19, and finally is combined with one side of the slidable member 18. Another strip-shaped transmission member 20 then passes through the pulley block 151 again and then passes through the blocking member 19 again, and finally is combined with another side of the slidable member 18.

The elongate member 17 is provided with two sets of blocking members 19, wherein one set of blocking members 19 is disposed adjacent to the pulley block 131, and another set of blocking members 19 is disposed adjacent to the pulley block 151. The range of movement of the slidable member 18 is restricted by the two sets of blocking members 19. Both sets of blocking members 19 have configurations or holes through which the strip-like transmission members 20 can pass.

The distance that the slidable member 18 moves is approximately equivalent to the maximum swing of the strip-shaped transmission member 20 when it is slid downward to drive the mass 15 for swinging.

Figure 6:
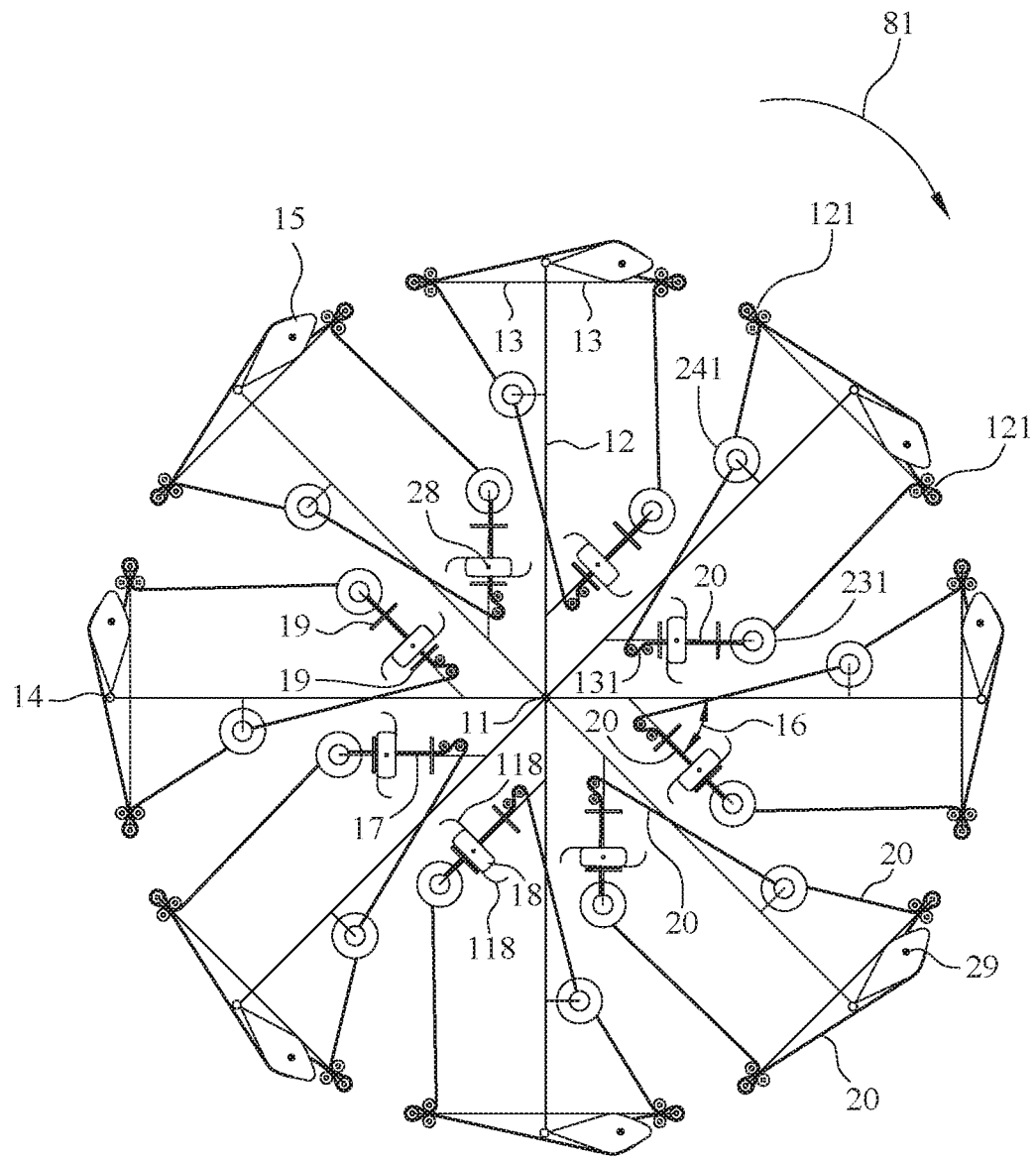
FIG. 6 is a schematic view of the transmission system including a multiple winch set according to another embodiment of the present invention.

In another embodiment of the present invention, as shown in FIG. 6, the pulley block 141 may be replaced by a multiple winch set 241, and the pulley block 151 may be replaced by a multiple winch set 231. In the embodiment of the multiple winch set is used, the strip-shaped transmission members 20 disposed on each of the radiating members 12 is increased to four, and the configuration and size of the multiple winch set 231 and 241 are the same, wherein the multiple winch set 241 is disposed on one side of the radiating member 12 in the reverse running direction, and the multiple winch set 231 is disposed on the side end of the elongate member 17.

Figure 7:
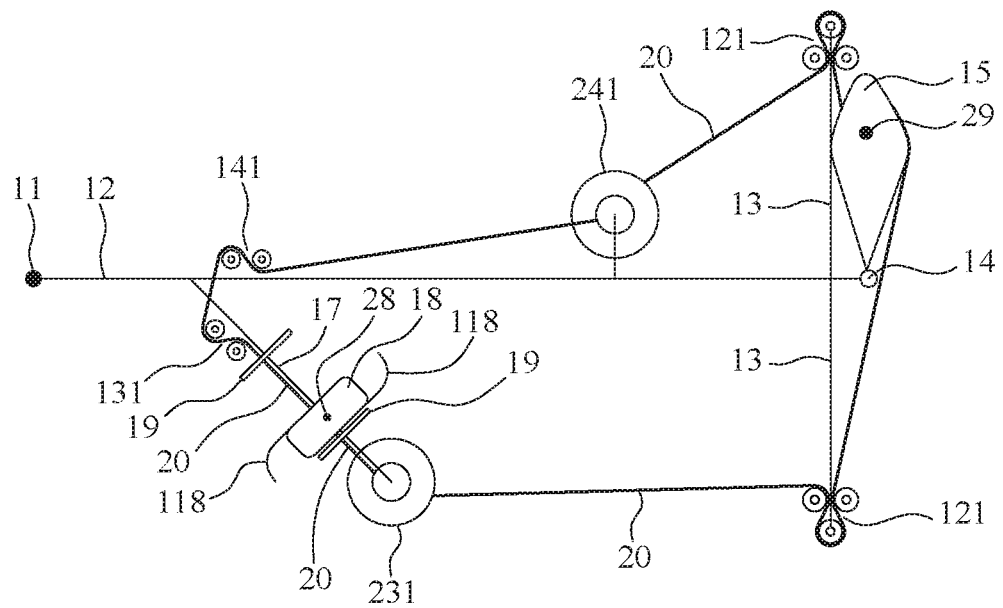
FIG. 7 is a schematic view of two sides of the swingable mass that are respectively combined with a transmission member, and the other ends of the two transmission members are respectively combined with the large winch of the multiple winch set, and the slidable member slides a shorter distance according to another embodiment of the present invention.

In another embodiment of the present invention, as shown in FIG. 7, the pulley block 141 is still retained on one side of the radiating member 12 in the reverse running direction, but the multiple winch set 241 is disposed adjacent to the pulley block 141, and the pulley block 151 is replaced by the multiple winch set 231. The other ends of the strip-shaped transmission members 20 on both sides of the slidable member 18 are respectively combined with a small winch 322 of the multiple winch sets 231, 241. An embodiment of the other ends of the strip-shaped transmission members 20 on both sides of the swingable mass 15 are respectively combined with a large winch 321 of the multiple winch sets 231, 241 so that the slidable member 18 slides a shorter distance and the swing of the swingable mass 15 is larger, which is suitable for the slidable member 18 itself that is very heavy and its weight is greater than the weight of the swingable mass 15. Also it is suitable for the total weight of the slidable member 18 and the containers 118 and the held substances that is heavy, and the total weight is greater than the weight of the swingable mass 15.

Figure 8:
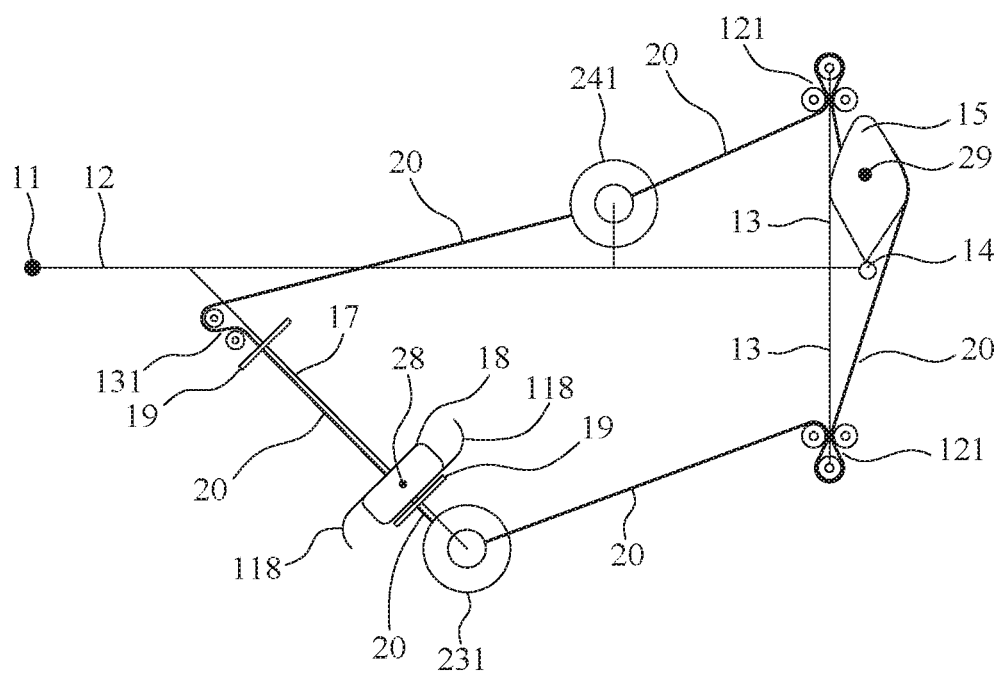
FIG. 8 is a schematic view of two sides of the swingable mass that are respectively combined with a single transmission member, and the other ends of the two transmission members are respectively combined with the small winch of the multiple winch set, and the slidable member slides a longer distance according to another embodiment of the present invention.

In another embodiment of the present invention, as shown in FIG. 8, the other ends of the strip-shaped transmission members 20 on both sides of the slidable member 18 are respectively combined with the large winch 321 of the multiple winch sets 231, 241. An embodiment of the other ends of the strip-shaped transmission members 20 on both sides of the swingable mass 15 are respectively combined with the small winches 322 of the multiple winch sets 231, 241 so that the slidable member 18 slides a longer distance and the swing of the swingable mass 15 is smaller, which is suitable for the total weight of the slidable member 18 and the containers 118 that is very light, and the total weight is less than the weight of the swingable mass 15, but the total weight of the containers 118 after being injected with the substances is greater than the weight of the swingable mass 15.

Figure 9:
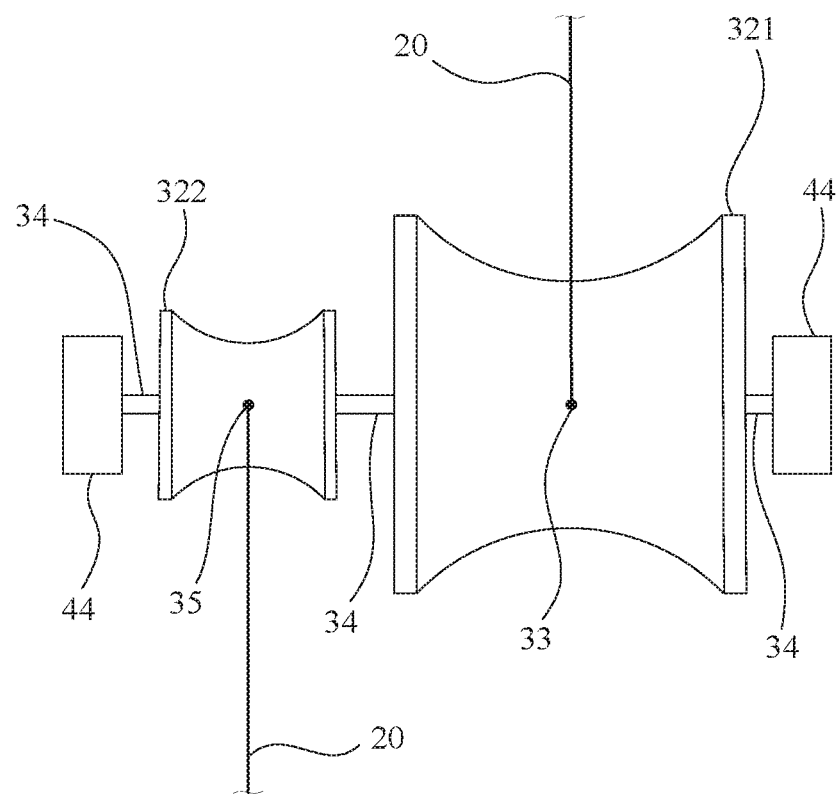
FIG. 9 is a schematic view of the multiple winch set according to an embodiment of the present invention.
Figure 10:
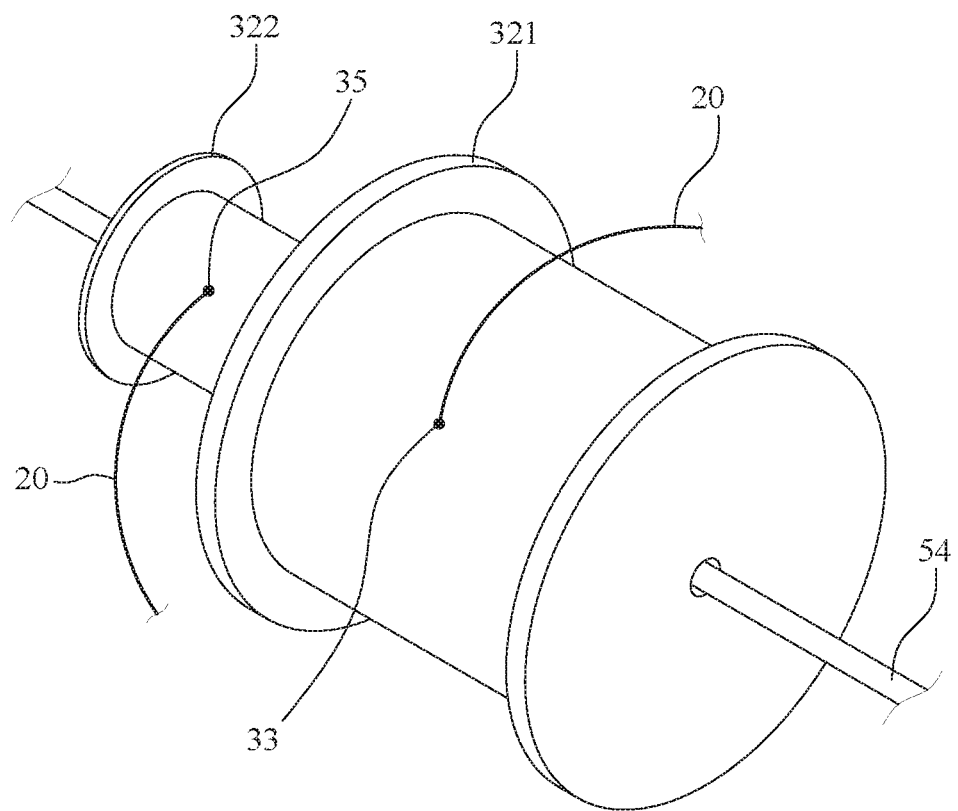
FIG. 10 is a schematic view of the multiple winch set according to another embodiment of the present invention.

As shown in FIG. 9 and FIG. 10, the multiple winch sets 231 and 241 are respectively composed of the large winch 321 and the small winch 322, which are coaxially formed by a shaft 34 or coaxially formed by a shaft 54. The large winch 321 and the small winch 322 are fixedly combined with the shaft 34 for rotating in synchronization with the shaft 34. The large winch 321 and the small winch 322 of the embodiment of FIG. 10 are integrated into one and synchronously rotating around the shaft 54 by the common through holes of the center of a circle that pass through the shaft 54.

Figure 11:
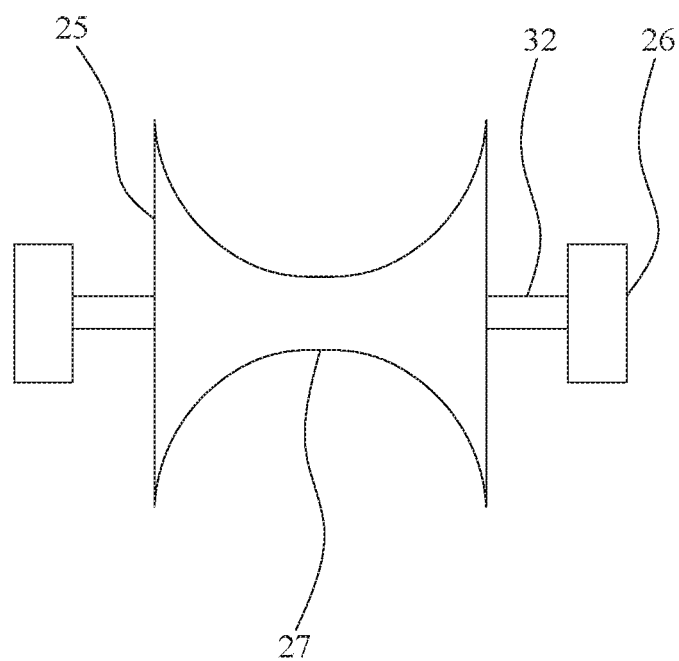
FIG. 11 is a schematic view of the pulley according to an embodiment of the present invention.

In an embodiment of the present invention, as shown in FIG. 11, the pulleys 25 of each pulley block has a deeper, wider U-shaped recess 27 to prevent the strip-like transmission member 20 from loosing from the pulley 25.

In the embodiment of the application of the multiple winch set, as shown in FIG. 6, one of the strip-shaped transmission member 20 that is combined with two sides of the mass 15 firstly passes through a set of pulley blocks 121 at the edge of the truss 13 and then is combined with the large winch 321 of the multiple winch set 241. Another strip-shaped transmission member 20 firstly passes through another set of pulley blocks 121 at another edge of the truss 13 and then is combined with the large winch 321 of the multiple winch set 241 and then is combined with the large winch 321 of the multiple winch set 231. Correspondingly, one of the strip-shaped transmission member 20 that is combined with two sides of the slidable member 18 firstly passes through the blocking member 19, and then passes through the pulley block 131 again, and finally is combined with the small winch 322 of the multiple winch set 241. Another strip-shaped transmission member 20 firstly passes through the blocking member 19 and then is combined with the small winch 322 of the multiple winch set 231.

In another embodiment of the application of the multiple winch set, as shown in FIG. 8, one of the strip-shaped transmission member 20 that is combined with two sides of the mass 15 firstly passes through a set of pulley blocks 121 at the edge of the truss 13 and then is combined with the small winch 322 of the multiple winch set 241. Another strip-shaped transmission member 20 firstly passes through another set of pulley blocks 121 at another edge of the truss 13 and then is combined with the large winch 321 of the multiple winch set 241 and then is combined with the small winch 322 of the multiple winch set 231. Correspondingly, one of the strip-shaped transmission member 20 that is combined with two sides of the slidable member 18 firstly passes through the blocking member 19, then passes through the pulley block 131 again, and finally is combined with the large winch 321 of the multiple winch set 241. Another strip-shaped transmission member 20 firstly passes through the blocking member 19 and is combined with the large winch 321 of the multiple winch set 231

It is to be noted that the two strip-shaped transmission members 20 that are combined with the large winch 321 of the multiple winch sets 231, 241 and the small winch 322 in the winding direction that is opposite to each other. In other words, when the large winch 321 of any of the multiple winch sets winds the strip-shaped transmission member 20 in the winding direction to make the transmission member 20 be in a loosened state, the small winch 322 winds the strip-shaped transmission member 20 in the winding direction to make the strip-shaped transmission member 20 be in a tightened state. By contrast, when the large winch 321 of any of the multiple winch sets winds the strip-shaped transmission member 20 in the winding direction to make the strip-shaped transmission member 20 be in a tightened state, the small winch 322 winds the strip-shaped transmission member 20 in the winding direction to make the transmission member 20 be in a loosened state. In addition, the large winch 321 and the small winch 322 still have a margin after the strip-shaped transmission member 20 is loosened, that is, there is still a length of the strip-shaped transmission member 20 that is wound around the winch and is not loosened.

On the other hand, in the two multiple winch sets 231, 241, the two large winches 321 wind the strip-shaped transmission member 20 in the opposite direction. In other words, when one of the large winches 321 loosens the strip-shaped transmission member 20, another large winch 321 tightens the strip-shaped transmission member 20. Similarly, since the large winch 321 and the small winch 322 are disposed by means of coaxially and synchronously rotating, in the two multiple winch sets 231, 241, the direction that the small winch 322 winds the strip-shaped transmission member 20 is also reversed. When one of the small winches 322 loosens the strip-shaped transmission member 20, another small winch 322 winds and tightens the strip-shaped transmission member 20.

As shown in FIG. 7, the large winch 321 loosens or tightens the length of the strip-shaped transmission member 20 that is approximately equal to the maximum swing of the strip-shaped transmission member 20 driven by the mass 15 for swinging at one hundred and eighty degrees, and the small winch 322 loosens or tightens the length of the strip-shaped transmission member 20 that is approximately equivalent to the distance that the slidable member 18 slides.

As shown in FIG. 8, the large winch 321 loosens or tightens the length of the strip-shaped transmission member 20 that is approximately equal to the distance that the slidable member 18 slides, and the small winch 322 loosens or tightens the length of the strip-shaped transmission member 20 that is approximately equivalent to the maximum swing of the strip transmission member 20 driven by the mass 15 for swinging at one hundred and eighty degrees.

At the time of assembly, lubricating oil should be added to the joints of the chute 24, the groove 27, the steel cable, the gear, the chain, the slidable member 18 and the elongate member 17, the sub-shaft 14, the shaft of the pulley, the bearing 44, and the like, ensuring that the runner system can run smoothly.

In addition, since the mass 15 and the slidable member 18 in the rotor system of the present invention are respectively in a collision with the truss 13 and the blocking member 19 during swing and sliding. In order to reduce the amplitude and noise of the collision between the devices, in the embodiment of the present invention, the position on the truss 13 that is touched by the mass 15 and the side on which the blocking member 19 is touched by the slidable member 18 may be provided with an elastic buffer portion such as rubber or rubber.

Hereinafter, the operation of the rotor system of the present invention will be described in detail.

The slidable member 18 has two containers 118 each with one opening for holding the substances in the opposite directions 22. The containers 118 are injected with the auxiliary system 21 of the fed substances that are independently disposed on the side of the reel in a specific orientation. Therefore, the maximum weight composition of the slidable member 18 includes its own weight that adds the weight of the substances when the most substances are left in the containers 118 after the substances are injected. The minimum weight composition of the slidable member 18 is that the containers 118 have only its own weight after pouring the light substances.

A combination of the elongate member 17 of the slidable member 18 and the radiating member 12 is combined in an inclined manner at an angle of about forty-five degrees plus or minus ten degrees. When the radiating member 12 is at a horizontal position of about three o'clock or nine o'clock, the slidable member 18 has two containers that are injected with the auxiliary system 21 of the fed substance, therefore, the weight is increased suddenly and the total weight is greater than the weight of the mass 15. The slidable member 18 slides downward due to the inclination and gravity, and potential energy can drive the mass 15 for swinging about one hundred and eighty degrees through the transmission system, thereby changing the length of the force arm of the center of gravity 29 of the mass 15. As a result, the length of the force arm of the center of gravity 29 of the mass 15 which causes the torsion toward the running direction 81 is increased, and the length of the force arm of the center of gravity 29 of the mass 15 which generates the torsion toward the reverse direction becomes small so that the outer ring system constituted by all the mass 15 generates a huge torsion toward the running direction 81.

When the weight of the slidable member 18 is greater than the swingable mass 15 and the associated radial member 12 is at the horizontal position of three o'clock or nine o'clock, the slidable member 18 slides downward and drives the swingable mass 15 for swinging about one hundred and eighty degrees and changes the length of the force arm and torque so that a huge torsion is generated in the running direction 81 by the outer ring system. Also the substances are injected into the containers 118 of the one-sided slidable member 18 that is only divided by the vertical central axis, and by increasing the weight of the slidable member 18 on one side of the inner ring system, so that the inner ring system which can originally generate the torsion toward the reverse running direction is changed to generate the forward torsion toward the running direction 81.

When the weight of the slidable member 18 is less than the swingable mass 15, a larger amount, heavier substances are injected into the containers 118 of the slidable member 18 at the horizontal orientation of three o'clock at the approximate position of the radiating member 12. At the same time, a smaller amount, lighter substances are injected into the containers 118 in the other opening direction of the slidable member 18 at the horizontal orientation of about nine o'clock at the approximate position of the radiating member 12. After the substances are injected, regardless of the left side or the right side of the vertical central axis, the total weight of the slidable member 18 after adding the substances becomes larger than the weight of the swingable mass 15 and the slidable member 18 slides downward and pulls the swingable mass 15 for swinging about one hundred and eighty degrees. At this time, the weight of the substances injected into the containers 118 makes the slidable member 18 which is originally lighter and cannot slide downward and cannot swing the slidable member 18 of the swingable mass 15 be changed to heavier, slide downward, and pull the swingable mass 15, and it also makes the outer ring system, which has a steady state and has a system balance point, become non-steady state, and will generate a huge torsion toward the running direction 81. Also the weight of the substances injected into the containers 118 of the slidable member 18 on the left side and the right side of the vertical center axis are different and the average force arm length of the slidable member 18 for holding a larger amount of substances is greater than the average force arm length of the slidable member 18 for holding a smaller amount of substances, and after the forward torsion and the reverse torsion are reciprocated each other, there will still be a huge torsion toward the running direction 81, deducting from the slidable member 18 that is approximately from six o'clock orientation to nine o'clock orientation, and that has almost no holding substances that is approximately from twelve o'clock orientation to three o'clock orientation, relative to the light weight, the inner ring system still has a huger torsion toward the running direction 81 after a relatively small counter-rotation torque generated by the forward torsion and reverse torsion are reciprocated each other.

When the inner and outer ring systems generate the torsion toward the running direction 81, the entire rotor system will generate good operating kinetic energy under the unbalanced and unsteady state of the system.

As for the operation of the multiple winch sets 231, 241, which can shorten the sliding distance of the slidable member 18 and the force arm length of the center of gravity 28, and enlarge the body shape of the swingable mass 15 and the distance far from the center of gravity 14 of the center of gravity 29. In particular, when the weight of the sliding member 18 is less than the weight of the swingable mass 15, the reel will generate better operating kinetic energy.

The rotor system of the present invention can be combined with other systems so that the kinetic energy produced by the reels is converted into other energy. For example, one side of the horizontal rotating shaft 11 of the rotor system can be coupled to the pivot of the bracket for fixing the rotor system, and the other side can be coupled to the pivot of the power system, so that the power system is driven through the rotation of the rotor system, thereby converting the kinetic energy of the rotor system into electrical energy.

In a further embodiment of the present invention, the rotor system can provide more than two identical reels in a multi-reel coaxial manner. More specifically, in a multi-reel coaxial embodiment, a first reel can be first fixedly coupled to the horizontal rotating shaft 11, and then the radiating member 12 of a second reel and the radiating member 12 of the fixed first reel are staggered by a certain angle, after that, the second reel is fixedly coupled to the horizontal rotating shaft 11. The radiating members 12 between the different reels can be staggered by the angle according to the following formula:

360 degrees÷(the number of sets of the radiating members 12 of a single reel)÷(the number of sets of the reels that are combined in the same horizontal rotating shaft 11).

This multi-reel coaxial arrangement can increase the torsion of the reel to the horizontal rotating shaft 11, thereby improving the efficiency of the rotor system.

The rotor system provided by the present invention has useful value in industrial field, but the above description is only a description of the preferred embodiment of the present invention, and those skilled in the art can easily make other various kinds of the improvements according to the above description, but still fall within the spirit of the invention and the scope of the patents defined below.

What is claimed is:

1. A device for generating energy, comprising: a rotor system for generating kinetic energy and a system for transporting substances, the rotor system comprising:
   a horizontal rotating shaft; and
   a plurality of sets of radiating members fixed to the horizontal rotating shaft and rotating with the horizontal rotating shaft to constitute a reel, each of the radiating members having a proximal end adjacent to the horizontal rotating shaft and a distal end opposite to the proximal end, each of the radiating members comprising:
      a truss symmetrically disposed at a position on the radiating member adjacent to the distal end;
      a sub-shaft disposed on the distal end of the radiating member;
      a swingable mass that is combined with the sub-shaft, and the swingable mass for swinging toward a running direction or a reverse running direction about the sub-shaft as a center;
      an elongate member disposed on the radiating member adjacent to the proximal end and facing one side of the running direction, and the elongate member forming an included angle with the radiating member; and
      a slidable member disposed on the elongate member and configured to be slidably disposed between a distance, a weight of the slidable member being less than a weight of the swingable mass, and the slidable member having two containers each with an opening for holding substances, the two containers extending in opposite directions from each other;
   wherein a transmission system is coupled to the swingable masses and the slidable members so that sliding of the slidable members drives the swingable masses for swinging;
   wherein each of the swingable masses of the radiating members constitutes an outer ring system, and each of the slidable members of the radiating members and the containers for holding the substances together constitute an inner ring system;
   wherein the system for transporting the substances is independently disposed on a left side and a right side of the rotor system divided by a vertical central axis, and wherein for each radiating member during operation of the rotor system:
      the substances are fed into the containers of the respective slidable member when the respective radiating member is at a three o'clock orientation of the rotor system and a nine o'clock orientation of the rotor system, the weight of the container at the three o'clock orientation that is fed with the substances is greater than the weight of the container at the nine o'clock orientation that is fed with the fed substances, such that the weight of the fed substances of the containers on the left side and right side divided by the vertical central axis is different, and a total weight of the fed substances and the slidable member itself is greater than the weight of the swingable mass;
      wherein when one of the radiating members is at the three or nine o'clock orientation of the rotor system: one of the containers of the slidable member is fed with the substances by the system for transporting the substances, so that total weight of the slidable member and the held substances is greater than the weight of the swingable mass and the slidable member slides down along with the held substances, and through the transmission system driving the swingable mass for swinging so that a length of a force arm of the swingable mass that generates a forward torque toward the running direction is lengthened, and a length of a force arm of the swingable mass that generates a reverse torque toward the reverse running direction is shortened, the outer ring system constituted by the swingable masses generates the forward torque toward the running direction by changing the length of the force arm;
      wherein the slidable member at from four o'clock orientation to six o'clock orientation of the rotor system and at from ten o'clock orientation to twelve o'clock orientation of the rotor system is in a state that an amount of the substances is held, and an average force arm length of the slidable member at from the four o'clock orientation to the six o'clock orientation is greater than an average force arm length of the slidable member at from the ten o'clock orientation to the twelve o'clock orientation, and the weight of the held substances of the slidable member at from the four o'clock orientation to the six o'clock orientation is greater than the weight of the slidable member at from the ten o'clock orientation to the twelve o'clock orientation, and the forward torque and the reverse torque that are respectively generated by the slidable member and the held substances therein at from the four o'clock orientation to the six o'clock orientation of the rotor system and at from the ten o'clock orientation to the twelve o'clock orientation of the rotor system result in a first net torque toward the running direction;
      wherein the slidable member at from the six o'clock orientation to the nine o'clock orientation of the rotor system and at the twelve o'clock orientation to the three o'clock orientation of the rotor system is in a state without holding the substances, and the forward torque and reverse torque that are respectively at the six o'clock orientation to the nine o'clock orientation of the rotor system and at the twelve o'clock orientation to the three o'clock orientation produce a second net torque in the reverse direction that is less than the first net torque in the running direction.

2. The device according to claim 1, wherein an included angle between each elongate member and the respective radiating member is from thirty-five degrees to fifty-five degrees, and a swinging amplitude of each swingable mass is one hundred and eighty degrees.

3. The device according to claim 1, wherein each elongate member is provided with two blocking members separated from each other, and the respective slidable member is slidably disposed between the respective blocking members.

4. The device according to claim 1, wherein for each radiating member: the swingable mass is coupled to the sub-shaft through a skeleton type extension structure, and a joint point of the swingable mass that is pulled by the transmission system is one side end of another skeleton type extension structure extending from a top end of the swingable mass.

5. The device according to claim 1, wherein each transmission system further includes:
a first multiple winch set disposed on one side of the radiating member facing the reverse running direction; and
a second multiple winch set disposed at an end opposite to a set point of the elongate member and the proximal end;
the first multiple winch set and the second multiple winch set have the same configuration and size and each comprise:
a large winch and a small winch having a common axis, and the large winch and the small winch are configured to synchronously rotate in the same direction, and the large winch and the small winch respectively wound around by a strip-shaped transmission member, and the two strip-shaped transmission members are wound in opposite directions such that when the large winch winds and tightens the strip-shaped transmission member coupled to the large winch, the strip-shaped transmission member coupled to the small winch loosens, and when the strip-shaped transmission member coupled to the large winch loosens, the small winch winds and tightens the strip-shaped transmission member coupled to the small winch;
after the large winch and the small winch loosen the strip-shaped transmission members, there is still a length of the strip-shaped transmission members respectively wound around the large winch and the small winch;
wherein for each radiating member: two sides of the swingable mass and two sides of the slidable member are respectively combined with the strip-shaped transmission members, the strip-shaped transmission members that are combined with the swingable mass respectively pass through a pulley block at the edge of the truss and then are combined with the large winch of the first multiple winch set and the large winch of the second multiple winch set, one of the strip-shaped transmission members that is combined with the slidable member passes through a blocking member, then passes through one or two pulley blocks, and then is combined with the small winch of the first multiple winch set, and another one of the strip-shaped transmission members that is combined with the slidable member passes through another blocking member, and then is directly combined with the small winch of the second multiple winch set,
wherein the winding direction of the strip-shaped transmission member on the large winch of the first multiple winch set is opposite to the winding direction of the strip-shaped transmission member on the large winch of the second multiple winch set, and the winding direction of the strip-shaped transmission member on the small winch of the first multiple winch set is opposite to the winding direction of the strip-shaped transmission member on the small winch of the second multiple winch set, and a tightening or loosening length of the corresponding strip-shaped transmission member by the large winches is the same as the maximum swinging amplitude of the strip-shaped transmission member driven by the swingable mass, and a tightening or loosening length of the corresponding strip-shaped transmission member by the small winches is the same as a sliding distance of the slidable member.

6. The device according to claim 1, wherein the rotor system includes more than two of the reels, and the reels are all combined with the horizontal rotating shaft.

7. A device for generating energy, comprising: a rotor system for generating kinetic energy and a system for transporting substance, the rotor system comprising:
a horizontal rotating shaft; and
a plurality of sets of radiating members fixed to the horizontal rotating shaft and rotating with the horizontal rotating shaft to constitute a reel, each of the radiating members having a proximal end adjacent to the horizontal rotating shaft and a distal end opposite to the proximal end, wherein each of the radiating members comprising:
a truss symmetrically disposed on the radiating member adjacent to the distal end;
a sub-shaft disposed at a position on the distal end of the radiating member;
a swingable mass combined with the sub-shaft, and the swingable mass for swinging toward a running direction or a reverse running direction about the sub-shaft as a center;
an elongate member disposed on the radiating member adjacent to the proximal end and facing one side of the running direction, and the elongate member forming an included angle with the radiating member;
a slidable member disposed on the elongate member and configured to be slidably disposed between a distance, the weight of the slidable member being larger than the weight of the swingable mass, and the slidable member having two containers each with an opening for holding the substances and that extend in opposite directions;
a transmission system coupled to the swingable mass and the slidable member so that sliding of the slidable member drives the swingable mass for swinging;
wherein each of the swingable masses of the radiating members constitutes an outer ring system, and each of the slidable members of the radiating members and the containers for holding the substances together constitute an inner ring system;
wherein the system for transporting the substances is independently disposed on a single side of the rotor system divided by a vertical central axis of the rotor system, and wherein during operation of the rotor system:
the substances are fed into the containers when the respective radiating member is at twelve o'clock orientation of the rotor system and the respective radiating member is located at three o'clock orientation of the rotor system, thereby increasing the weight of each of the slidable members of the radiating members of the inner ring system to increase the torque in the running direction;
wherein each of the slidable members of the radiating members in the single side increases the torque with respect to the horizontal rotating shaft by the held substances, so that the inner ring system generates forward torque toward the running direction;
wherein for each radiating member that is located at a horizontal position of the rotor system: the slidable member slides downward, and the slidable mass is driven by the transmission system for swinging so that a length of a force arm of the swingable mass that generates the forward torque toward the running direction is lengthened, and a length of a force arm of the swingable mass that generates a torque toward the reverse running direction is shortened;

wherein the outer ring system generates the forward torque toward the running direction by changing the length of the force arm, the rotor system combining the outer ring system with the inner ring system that also generates the forward torque toward the running direction to provide operating kinetic energy.

8. The device according to claim 7, wherein an included angle between each elongate member and the respective radiating member is from thirty-five degrees to fifty-five degrees, and a swinging amplitude of each swingable mass is one hundred and eighty degrees.

9. The device according to claim 7, wherein each elongate member is provided with two blocking members separated from each other, and the respective slidable member is slidably disposed between the respective blocking members.

10. The device according to claim 7, wherein for each radiating member: the swingable mass is coupled to the sub-shaft through a skeleton type extension structure, and a joint point of the swingable mass that is pulled by the transmission system is one side end of another skeleton type extension structure extending from a top end of the swingable mass.

11. The device according to claim 7, wherein each transmission system further includes:

a first multiple winch set disposed on one side of the radiating member facing the reverse running direction; and a second multiple winch set disposed at an end opposite to a set point of the elongate member and the proximal end;

the first multiple winch set and the second multiple winch set have the same configuration and size and each comprise:

a large winch and a small winch having a common axis, and the large winch and the small winch are configured to synchronously rotate in the same direction, and the large winch and the small winch respectively wound around by a strip-shaped transmission member, and the two strip-shaped transmission members are wound in opposite directions such that when the large winch winds and tightens the strip-shaped transmission member coupled to the large winch, the strip-shaped transmission member coupled to the small winch loosens, and when the strip-shaped transmission member coupled to the large winch loosens, the small winch winds and tightens the strip-shaped transmission member coupled to the small winch;

after the large winch and the small winch loosen the strip-shaped transmission members, there is still a length of the strip-shaped transmission members respectively wound around the large winch and the small winch;

wherein for each radiating member: two sides of the swingable mass and two sides of the slidable member are respectively combined with the strip-shaped transmission members, the strip-shaped transmission members that are combined with the swingable mass respectively pass through a pulley block at the edge of the truss and then are combined with the large winch of the first multiple winch set and the large winch of the second multiple winch set, one of the strip-shaped transmission members that is combined with the slidable member passes through a blocking member, then passes through one or two pulley blocks, and then is combined with the small winch of the first multiple winch set, and another one of the strip-shaped transmission members that is combined with the slidable member passes through another blocking member, and then is directly combined with the small winch of the second multiple winch set, wherein the winding direction of the strip-shaped transmission member on the large winch of the first multiple winch set is opposite to the winding direction of the strip-shaped transmission member on the large winch of the second multiple winch set, and the winding direction of the strip-shaped transmission member on the small winch of the first multiple winch set is opposite to the winding direction of the strip-shaped transmission member on the small winch of the second multiple winch set, and a tightening or loosening length of the corresponding strip-shaped transmission member by the large winches is the same as the maximum swinging amplitude of the strip-shaped transmission member driven by the swingable mass, and a tightening or loosening length of the corresponding strip-shaped transmission member by the small winches is the same as a sliding distance of the slidable member.

12. The device according to claim 7, wherein the rotor system includes more than two of the reels, and the reels are all combined with the horizontal rotating shaft.

* * * * *